United States Patent
Meier et al.

(10) Patent No.: US 12,490,194 B2
(45) Date of Patent: Dec. 2, 2025

(54) BATTERY-OPERATED MONITORING DEVICE, SYSTEM AND METHOD

(71) Applicant: ROOMZ S.A., Fribourg (CH)

(72) Inventors: Roger Meier, Granges-Paccot (CH); Patrick Terraux, Bulle (CH)

(73) Assignee: ROOMZ S.A., Fribourg (CH)

( * ) Notice: Subject to any disclaimer, the term of this patent is extended or adjusted under 35 U.S.C. 154(b) by 0 days.

(21) Appl. No.: 18/761,965

(22) Filed: Jul. 2, 2024

(65) Prior Publication Data

US 2024/0357505 A1    Oct. 24, 2024

Related U.S. Application Data

(63) Continuation of application No. 16/955,922, filed as application No. PCT/EP2018/086031 on Dec. 19, 2018, now Pat. No. 12,058,620.

(30) Foreign Application Priority Data

Dec. 20, 2017    (EP) .................................... 17209164

(51) Int. Cl.
*H04W 52/02* (2009.01)
*G06Q 10/02* (2012.01)
*H04W 84/18* (2009.01)

(52) U.S. Cl.
CPC ........ *H04W 52/0251* (2013.01); *G06Q 10/02* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 5,003,580 A * | 3/1991 | Duong | .................... | H04M 1/26 |
| | | | | 379/442 |
| 5,344,068 A * | 9/1994 | Haessig | ................... | F24F 11/00 |
| | | | | 236/47 |
| 5,423,045 A * | 6/1995 | Kannan | ................. | G06F 1/3203 |
| | | | | 712/E9.032 |
| 5,539,810 A * | 7/1996 | Kennedy, III | ..... | H04B 7/18558 |
| | | | | 340/447 |
| 6,388,399 B1 * | 5/2002 | Eckel | .................... | H05B 47/10 |
| | | | | 374/E1.004 |

(Continued)

FOREIGN PATENT DOCUMENTS

CA    2728759 A1    4/2012
EP    2348371 A1    7/2011

(Continued)

OTHER PUBLICATIONS

International Search Report and Written Opinion for International Application No. PCT/EP2018/086031, mailed Feb. 21, 2019, 11 Pages.

*Primary Examiner* — Christopher T Wyllie
(74) *Attorney, Agent, or Firm* — DLA Piper LLP US

(57) ABSTRACT

The present invention relates to the management of shared work spaces. A goal is to accurately reflect the actual status of a booking as close to real time as possible. Embodiments of the invention allow for low-power, battery operated, motion sensor devices to report the actual status of shared work spaces to a central server using existing wireless communications means in the environment where the shared work spaces are to be managed.

12 Claims, 3 Drawing Sheets

(56) References Cited

U.S. PATENT DOCUMENTS

| | | | |
|---|---|---|---|
| 8,185,762 B1 | 5/2012 | Spangler et al. | |
| 2007/0162315 A1* | 7/2007 | Hodges | G06Q 10/02 |
| | | | 705/7.12 |
| 2008/0089277 A1 | 4/2008 | Alexander et al. | |
| 2010/0151211 A1 | 6/2010 | Kodaira et al. | |
| 2011/0060846 A1* | 3/2011 | Waldrop | G06Q 30/0611 |
| | | | 709/249 |
| 2011/0181412 A1* | 7/2011 | Alexander | G05B 19/042 |
| | | | 340/541 |
| 2011/0317078 A1* | 12/2011 | Johns | H04N 5/63 |
| | | | 348/730 |
| 2012/0083305 A1 | 4/2012 | Alexander et al. | |
| 2013/0335240 A1* | 12/2013 | Meier | G08G 1/042 |
| | | | 340/932.2 |
| 2014/0039946 A1* | 2/2014 | Spiker | G04F 1/005 |
| | | | 705/5 |
| 2016/0241889 A1* | 8/2016 | Long | H04N 21/8456 |
| 2017/0109481 A1* | 4/2017 | Johnson | G16H 40/20 |
| 2018/0103411 A1* | 4/2018 | Greene | H04W 52/46 |
| 2018/0267594 A1* | 9/2018 | Meier | G06Q 10/02 |
| 2019/0387192 A1* | 12/2019 | Fang | H04N 21/43615 |
| 2020/0344693 A1* | 10/2020 | Meier | G06Q 10/02 |
| 2022/0022012 A1* | 1/2022 | Meier | H04W 4/029 |
| 2024/0357505 A1* | 10/2024 | Meier | G06Q 10/02 |

FOREIGN PATENT DOCUMENTS

| | | | | |
|---|---|---|---|---|
| EP | 3502987 A1 | 6/2019 | | |
| WO | 2008048933 A2 | 4/2008 | | |
| WO | WO-2017037125 A1 * | 3/2017 | | G06F 3/147 |

* cited by examiner

BATTERY-OPERATED MONITORING DEVICE, SYSTEM AND METHOD

CROSS REFERENCE TO RELATED APPLICATIONS

This application is a Continuation application to U.S. application Ser. No. 16/955,922 filed Jun. 19, 2020, which is a National Stage Application of U.S. National Stage Application of International Application No. PCT/EP2018/086031 filed Dec. 19, 2018, which claims priority from European Application No. 17209164.7 filed Dec. 20, 2107. The entirety of all the above-listed applications are incorporated herein by reference.

TECHNICAL DOMAIN

The present inventive concepts relate generally to the domain of digital processing. More particularly, these concepts find use in systems and methods for managing and reporting on the use of shared spaces, such as offices, conference rooms or cubicles.

BACKGROUND

There are currently different systems and methods allowing for the management, planning and recording of the reservation of shared spaces or resources such as rooms or shared desks for example, in buildings such as office buildings, offices, conference centers and other buildings where the shared spaces can be booked for use by different users. These systems often comprise a central server which receives all booking requests and which allows for the visualisation of the states of booking and of occupation of the shared spaces from one or more workstations.

Booking information, once stored at the central server, must be updated if possible in real time or at least with a minimal time lag to closely reflect reality.

This updating of information is generally very tedious because someone has to follow the actual status of the bookings and update the information on the server. This updating is thus often neglected. Indeed, it often happens in practice that the actual occupation of a shared space does not correspond to its occupation as planned and as stored in the central server. This may arise in particular because, for example:

some planned meetings are canceled without the central server being informed;
some meetings last longer than expected, which requires use of the shared space longer than the length of booking; or
a meeting lasts less time than expected and therefore the booked shared space becomes available sooner than expected.

Different systems have been developed and implemented to try to solve the problems described above. Known solutions involve the use of a computer with a display screen for showing the occupancy status of one or more of the managed spaces, the computer having access to the central server where bookings are memorised. Users may interact with the computer in order to update or otherwise modify the booking information or occupancy status of one or more of the spaces. In some such systems, display screens are placed close to the shared spaces for which the booking is to be managed. These screens communicate with the central server and are usually able to display the part of the content of the central server concerning the shared space close to which they are placed.

Most of the existing systems have several drawbacks. The screen often takes the form of a touch pad, providing access to several functions via various buttons and menus. Consequently, these systems may often prove to be complex for practical use. Moreover, this generally results in the systems being relatively expensive.

Another disadvantage is that the screens generally tend to have high energy consumption. Being large consumers of power, the screens usually require a cabled power supply. A suitable power supply and routing may be provided during the construction of a building, but it is economically less feasible to retrofit a suitable power supply system in an existing building, especially when the wiring required for powering the screens was not taken into account at the time the building was designed.

Finally, having screens deployed each at their respective shared space does not necessarily solve the problem of updating the booking status at the server to reflect the actual status of the shared space because someone still has to update the server.

A screen of the type mentioned above is described in International Patent Application Publication No. 2010/151211. In this document, a display device is connected to a scheduling server which is responsible for the management of resources such as a shared space. The display device receives messages from the scheduling server and updates the display if necessary. The display device may also send messages to the scheduling server to confirm that a meeting began, for example. The display device and the communications means described in this document are high energy consumers. Consequently, the display has to be hardwired to be of practical use.

U.S. Pat. No. 8,185,762 describes a room management system that uses low-energy screens requiring no cabled power supply. The main feature of the system described in this US patent is that the screens are powered by energy harvesting. Due to the energy sources used, it is not possible to obtain sufficient power to use communication protocols requiring a lot of energy, such as, for example the widely adopted WiFi protocol. It is therefore necessary to use another dedicated communication protocol, which will often require the installation of a specific wireless infrastructure with dedicated base-stations and antennas. This makes the system very inflexible.

International Patent Application Publication No. 17037125 describes a system and a method for managing the occupation of shared spaces. The system includes a central server for managing information related to the occupation of rooms and a display device placed near each room whose occupation is being managed, the displays each having first wireless bidirectional communication channel for communicating with the server. The first wireless communications channels can be in either active or inactive states, and when in inactive state its respective display and associated communication module is switched off. The goal of having active and inactive states is to save power when the system is not required to be active since the first communications channel is one which consumes a lot of power. The displays also each have second communication means for communicating with the central server using a second, lower power, communication protocol. The power saving goal is achieved by using the second communication channel only to send signals to wake up one or more displays and to use the first communication channel for transferring data related to the room occupancy.

BRIEF SUMMARY OF THE INVENTION

In view of the state of the art, there is a need for a method for managing the occupation of shared spaces in a practical and efficient manner, using a system which has low power consumption, preferably using readily-available standard technology in order to be readily deployed in most office environments. More particularly, there is a need to provide reliable and up-to-date information related to the actual room occupancy.

A goal of the present invention is to provide information concerning the state of occupation of a space, such as a shared work space. According to some embodiments, said information may be provided at a place which is remote from the shared work space. According to other embodiments, said information may be provided close to the shared work space. In all embodiments, the information is provided without relying on a wire-line communications channel. According to various embodiments, actual occupation status of the shared work spaces is relayed to a centralised server remote from the shared work spaces in order to keep a centralised booking schedule updated in a timely fashion. In some embodiments, the booking schedule or updated booking schedule can be loaded from the centralised server to the shared work spaces as part of the update routine. In some embodiments a display of updated occupation status information is made available at the shared work spaces. A further goal is to have the locally displayed occupation status reflect the actual occupation status of the work space as closely as possible.

Preferably, the state of occupation of the shared work space is transmitted from the vicinity of the shared work space to a server by a wireless communications channel satisfying a protocol which is generally known and widely used in most work space environments.

According to a first aspect, provision is made for a motion sensor, such as a Passive Infrared Sensor (PIR), configured to monitor for movement at the shared work space and to transmit information regarding the thus detected occupation status to a server via a wireless communication channel. There is disclosed a monitoring device for detecting whether a space is occupied, comprising:
  a presence detector configured to monitor an occupation status of said space;
  a time-out counter;
  a wireless transmitter configured to be automatically switched between a default sleep mode and an operating mode; and
  a processor for controlling the monitoring device;
the monitoring device having:
  an armed mode, during which the time-out counter, pre-initialised using a locally stored wait time value, is configured to count towards time-out; and
  an unarmed mode, during which the time-out counter is disabled;
the processor configured to:
  switch the monitoring device from unarmed mode to armed mode either:
    at a locally stored start time; or
    at a time when the presence detector detects a presence;
  during armed mode, re-initialise the time-out counter using the wait time value when the presence detector detects a presence; and
  return the monitoring device to the unarmed mode when the time-out counter times out;
wherein the processor is further configured to:
  switch the transmitter from the sleep mode to the operating mode once the time-out counter has timed out, said time-out indicating that the space has been un-occupied for the past wait time; and
  return the transmitter to the sleep mode at least after having transmitted a message indicating at least that the space is un-occupied.

According to another aspect, disclosure is made of a monitoring system comprising one or more monitoring devices as described above, each monitoring device for monitoring an occupation status of its respective space, the system further comprising, for each monitoring device, a corresponding display device, the display device comprising:
  a display screen;
  a wireless receiver configured to be automatically switched between a default sleep mode and an operating mode; and
  a controller configured to control the display device at least to display on the display screen an indication of the occupation status of the corresponding monitored space;
the controller further configured to:
  intermittently switch the receiver to the operating mode and back to sleep mode in order to allow the display device to receive updated occupation status information concerning the monitored space; and
  update the displayed occupation status accordingly.

According to yet another aspect, provision is made for a method for managing, at a central server, a database comprising scheduling data relative to planned occupation of one or more spaces, the one or more spaces being monitored by a monitoring device for detecting a presence in the respective space, each monitoring device having a wireless transceiver configured to be off by default and to be automatically switched on and off and being configured to begin monitoring at a given start time and to continue monitoring over a given wait time, the wait time being re-initialised when a presence is detected, the method comprising:
  when no presence has been detected over the wait time or over the wait time after re-initialisation, switching on the transceiver by the monitoring device and sending a message to the server indicating that the monitored space is un-occupied;
  updating the scheduling data to reflect the indication in the message;
  sending a message from the server to the monitoring device with a new start time.

BRIEF DESCRIPTION OF THE DRAWINGS

The inventive concepts described herein will be better understood thanks to the detailed description which follows and the accompanying drawings, which are given as non-limiting examples of embodiments of the inventive concepts, namely.

DETAILED DESCRIPTION

Embodiments described herein allow for shared spaces to be conveniently managed, such management including booking of the spaces, monitoring of the use of the spaces, updating booking status to reflect actual usage of the spaces and thereby freeing up of spaces for more efficient use, as well as statistical reporting on the use of spaces in order to provide for more efficient planning of resources.

Although it could be foreseeable for a monitoring device of the present invention to be one which plugs into a mains supply without detracting from the main inventive concept, a goal of embodiments disclosed herein is that the system be readily adaptable for installation in most office environments and that the monitoring devices and any other equipment deployed along with the monitoring devices as part of a monitoring system be ideally of low power consumption type. Preferably, the monitoring devices and any other equipment should be battery operated. According to at least one embodiment, the monitoring devices and related equipment at each of the shared spaces may be operated using energy obtained via solar power. Consequently, no external cables are required for routing power from a central power source to the monitoring devices or related equipment. Similarly, since communications to and from the monitoring devices are provided using wireless communication technology, no additional wiring is required for providing communications capability within the system. As such, the systems disclosed herein are simple to install in a standard office environment, rendering their deployment extremely straightforward and scalable.

Figure 1:
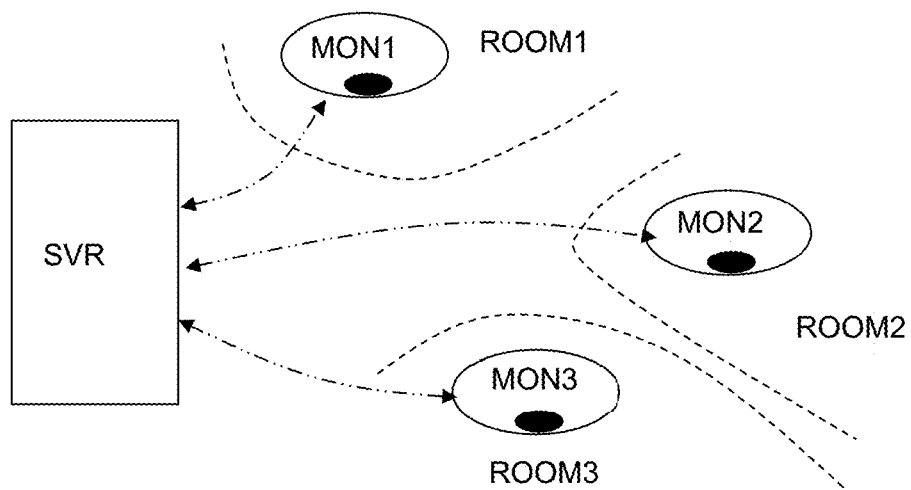
FIG. 1, illustrating a system in which an embodiment of the present invention may be deployed.

FIG. 1 illustrates a system according to an embodiment of the present invention. The system comprises one or more monitoring devices. Each of the monitoring devices is placed close to a respective space that it is intended to monitor. In this embodiment, there is one monitoring device per space to be monitored. An example of a space to be monitored is a conference room, which may be reserved for use by any from a number of different people at different times.

All of the monitoring devices of the system are connected, via a wireless communications channel, to a centralised server. The centralised server has access to a calendar which stores booking information or scheduling data relative to the spaces being monitored and is thus configured to allow for the management of the bookings of the spaces being monitored. In some embodiments the monitoring devices may communicate first with a gateway device, which is connected to the centralised server. In some cases the gateway device may function as the centralised server, in which case the gateway device has access to the calendar. A person may book one or more of these spaces by connecting to the server, identifying the space to be booked and entering at least a start time, and preferably also an end time, for the booking. The centralised server may be a cloud server, accessible from any from a number of different physical locations. The centralised server may otherwise be an appropriate computing device located at some central location on the premises of the different spaces whose bookings are being managed. According to an embodiment the centralised server is accessible via a computer terminal in an office. According to another embodiment the centralised server is accessible via a web browser, the user connecting to the server via a mobile phone for example. Thus it is even possible for a user to connect to the server from the vicinity of the room which he or she would like to book. The user connection to the server may be made via any communication means including wired communication means or wireless communication means such as WiFi or via 3G or 4G connection for example.

Figure 2:
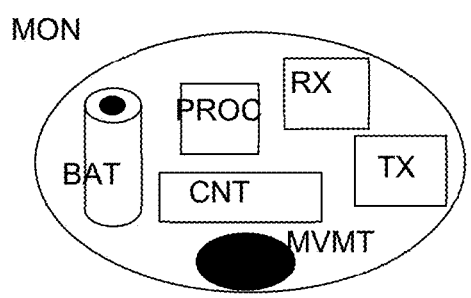
FIG. 2, showing a monitoring device according to an embodiment disclosed herein.

FIG. 2 shows more detail of a monitoring device according to an embodiment. Embodiments of the present invention may use any type of presence detector as long as the presence detector is capable of detecting whether a person is present in the space being monitored. Suitable presence detectors include laser detectors, pressure mats, cameras and badge entry systems for example. A preferred presence detector however is a motion sensor because of its simplicity, reliability and low cost.

According to a preferred embodiment, the monitoring device includes a motion sensor, otherwise known as a movement detector. A suitable motion sensor is a passive infrared detector (PIR) because PIRs have a range of up to 10 metres or so, making them suitable for convenient placement at the space or room to be monitored. PIRs also have low-power consumption characteristics, making them suitable for embodiments of the present invention where the monitoring device is said to be battery operated (BAT). By battery-operated it means that the device does not rely on a wired power supply and may rely on a suitable power storage device such as a battery or a capacitor as part of a photovoltaic energy source. According to an embodiment, the monitoring device may be solar powered.

The battery-operated (BAT) monitoring device (MON) has the motion sensor (MVMT) for detecting movement at the space being monitored (ROOM1, ROOM2, ROOM3) a processor (PROC) for controlling the operation of the device and its components, a time-out counter (CNT) and a radio transceiver (RX, TX) for communicating wirelessly with the centralised server. The device may also have a memory (MEM). Motion sensors, such as PIRs, are already known to consume very little power when working and so are entirely suitable for use in the disclosed monitoring device. Such motion detectors are usually configured to continuously monitor for movements and do not consume much power while doing so. On the other hand, radio transceivers are notorious for consuming larger amounts of power and so embodiments of the disclosed detectors are configured such that the radio transceiver is switched off during operation and only switched on in order to communicate with the centralised server and then switched off again after a certain amount of information has been passed from the monitoring device to the centralised server and, where necessary, from the centralised server to the monitoring device. The radio transceiver can therefore be said to be off by default. The radio transceiver can only be woken up by the monitoring device and not by the server. Communications with the centralised server are therefore initiated, and indeed also terminated, by the monitoring device. Any type of wireless radio transceiver may be used. Preferably, WiFi or WLAN radio transceivers are used because the fact that most office spaces already have such communication systems installed renders the disclosed system particularly easy to install in any office environment.

As mentioned above, in some embodiments the transceiver may communicate with a gateway device located on the premises where the monitored space is located, with the gateway device ensuring the connection towards the centralised server. Other monitoring devices within the same premises may also share the same gateway device, so that communications between each monitoring device and the server pass through the gateway device. Alternatively there may be more than one gateway device to provide connectivity for one or more monitoring devices to the centralised server. In other embodiments, the monitoring devices may communicate directly with the centralised server.

According to various embodiments, the monitoring device is programmed to set its counter, by default, to an unarmed mode and it can be programmed to set the counter, under certain conditions, to an armed mode. The counter is a time-out counter which can be initialised to some pre-determined value and which can count towards a pre-determined time-out value. For example, the time-out counter may be initialised with a value of 600 seconds and allowed to count towards a time-out of 0. In armed mode, the counter, initialised to a pre-determined wait time value, is allowed to count towards time-out. During this time if the motion detector detects any movement in the space being monitored, then the time-out counter will be re-initialised to the wait time value, thus delaying the time-out each time a movement is detected. Consequently, time-out will occur either following a wait time after armed mode has been entered, if no one is present in the monitored space, or a wait time after the last movement has been detected. Whenever the counter times out, the monitoring device switches on its wireless transceiver and sends a message to the server to indicate that no presence has been detected over the past wait time since the last movement was detected. The monitoring device also receives a new time for going back to armed mode and then switches off the wireless transceiver to save energy. In unarmed mode, the counter is disabled from counting. The motion detector still monitors for motion at its respective shared space in the normal way, but since the counter cannot reach time-out in the unarmed mode, any detection of movement or non-detection of movement has no effect on the wireless transceiver. The monitoring device remains in unarmed mode until it is time for the next armed mode to begin. This non-reporting, even though the motion detector is able to detect motion, is a characteristic of the unarmed mode of the monitoring device. Consequently, power consumption of the monitoring device is reduced to a minimum.

A general condition for setting the monitoring device to armed mode may be for example at a time when the monitored space is expected to be occupied. This condition can be set up by loading an expected start time for a meeting in the monitored space for example. The start time or start times for any future scheduled expected occupation may be loaded from the server based on a centralised calendar of scheduled meetings for all of the monitored spaces. The start times may be sent whenever the monitoring device switches its transceiver on. Consequently, only start times which occur at a time later than the present time may be programmed. For this reason, a special arrangement has to be made for setting the monitor to armed mode the first time it is deployed and before it has any knowledge of planned start times. A predetermined start time may therefore be either built in to the monitoring device or otherwise pre-loaded. This can be said to be a pre-determined condition for setting the monitoring device to armed mode. For example, all monitoring devices may receive a time of 9 am as a first start time at construction time or a field engineer having root access to the monitoring device may programme the device with an initial start time. The same goes for wait times. The wait time may be regarded as a window for certainty for assuming that if no movement has been detected during that time then nobody is present. Future wait times may be received from the server in the same way as start times or they may be left at a default wait time. The initial wait time may be loaded in the same way as the initial start time described above.

Embodiments of the present invention therefore allow the centralised server to be updated as to the occupation status of the spaces being monitored in a very precise manner. A monitoring device having a wait time of 15 minutes for example, may send a message to the server at 10:15 am when its time-out counter times out. The server can then deduce that the room has been empty since 10 am. In some embodiments the server keeps track of individual monitoring device's wait times and so can calculate the actual time when a space became un-occupied by subtracting the wait time from the time it received the time-out message. In other embodiments the monitoring device may report the actual time that the space was deemed as being un-occupied by performing the calculation itself. In other embodiments the monitoring device may report both the time that the time-out occurred and its own wait time, thereby allowing the server to deduce the actual time the space was liberated.

According to some embodiments, the monitoring device further includes a real-time counter so that start times received from the server may be used directly to set the time for going to armed mode. Similarly, by using a real-time clock, the monitoring device may accurately report the time that time-out occurred in terms of real time. According to other embodiments, the monitoring device may have a simple counter instead of a real time clock, the device being programmed to calculate start times with respect to a time when the start time was received and to report time-out times in a way in which the server is able to calculate the time-out time in terms of real time. Embodiments of the invention provide for the monitoring devices of the system to arm themselves at a given time, for example at a time when a meeting is expected to take place in the shared space of the respective monitoring device, and to check, during a given window of confidence, say fifteen minutes, whether or not there is movement in the space. If no movement is detected within the given window of confidence, then there is a chance that nobody has been present in the space during that time, or at least that nobody moved during that time. By having a window of confidence of fifteen minutes for example, it raises the probability that the hypothesis of nobody being there is actually correct. This is because it is unlikely that a person being in the monitored space would be able to remain still over such a long period. The window of confidence is referred to herein as a wait time. According to the embodiments, the counter of the monitoring device in question is initialised to the wait time value (e.g. 15 minutes).

Armed mode begins once the start time has been reached. In armed mode the counter counts towards its time-out value. If the motion sensor detects movement in the room before the counter times out, then the timer is re-initialised to the wait time value. Whenever the counter times out, the processor registers that no movement has been detected during the last wait time. The processor then wakes up the radio transceiver and sends a message to the central server that no movement has been detected for the past wait time (e.g. 15 minutes). At this time the processor may receive a message to programme the time of the next start time, or planned booking time or the next n planned booking times in order that the monitoring device may set itself to the armed mode again at that time or at those times. The monitoring device then returns to unarmed mode pending the next booking time when it then switches back to armed mode as before. According to a variation of this embodiment, one or more default times may be programmed in the processor in order to ensure that the device goes into armed mode at least once, even if no booking times are sent by the server.

As can be seen from the example above, the monitoring device is programmed to change from unarmed mode to armed mode at a time when the room is expected to be used, i.e. at a booking time for the room, and to monitor for movement until it is sure that nobody is in the room i.e. until no movement is detected during the wait time. Consequently, if no movement is detected for fifteen minutes (an example wait time) after the booking time, it can be assumed that nobody entered the room at all. The booking should then be modified to indicate that the room is free. Any time movement is detected, the counter is re-initialised using the wait time value. Thus, the room can be reported to be free again fifteen minutes after the last movement is detected. In this case fifteen minutes was chosen as a wait time. Any reasonable choice may be made for the wait time—in some cases this could be five minutes, for example, as long as it long enough to assume that a person being present would be unlikely to move for the duration of the wait time. The radio transceiver is switched on only for communicating with the centralised server to report the actual usage of the room and to receive a new time for going to armed mode, where applicable. A new wait time value may also be received along with the new start time. The device returns to unarmed mode after no further movement has been detected during the wait time following the last detected movement.

Times for armed mode may be received from the server whenever the monitoring device wakes up the radio communications transceiver (or otherwise switches on the radio communications transceiver). In some embodiments there may be pre-programmed times for going to armed mode. This is useful given the fact that the central calendar may not have a booking for a given room for the rest of the day or week and so the server may not be able to provide the next scheduled armed time. In other embodiments the server may automatically provide a default time for going to armed mode in response to receiving a communication from the monitoring device. This may be useful in the case that there are no further booking times scheduled. For example, when the server receives the communication from the monitoring device, it may add an hour to the current time and send that value as a new start time to the mentoring device. This ensures that the server will have another possibility to make sure the booking calendar is updated to reflect the reality. Similarly, the very first armed time, or start time, may be programmed in the monitoring devices by default, say at 9 am every day, so that at least the first switching on of the radio transceiver is guaranteed.

In some embodiments a single booking time, for example the next booking time, may be sent to the monitoring device which reports on the usage of a particular room. In some embodiments a list of future booking times may be provided and stored in a memory of the monitoring device in order to programme future arming times. In some embodiments the centralised server may also communicate a new wait time as well as the next booking time or times.

As mentioned above, once a monitoring device has communicated an updated usage time for a given room, the calendar accessed by the centralised server may be updated to reflect the true occupation status of the rooms, thereby freeing up one or more rooms for re-booking where applicable. In systems in which statistics related to the use of the rooms are being kept, the central sever may update a record to show the precise use of a given room by using the wait time value to back-date the reporting to reflect the real usage of the room. A room in which no movement is detected at the booking time and no movement is detected for the duration of the wait time will thus be reported as having been unused, at least from the booking time on. A room in which movement is detected five minutes after the booking time, for which a wait time of 20 minutes exists, and for which no further movement is detected for a further 20 minutes will be reported as having been used for five minutes following the booking time. A room for which movement is detected on and off, within the initial wait time will have its wait time reinitialised because of the detected movements. For such a room, where movements are detected within the initial wait time and then repeatedly within subsequent re-initialised wait times between the booking time until 30 minutes after the booking end time will be reported as having been used during the whole booking time until the value of the last re-initialised wait time after the booking end time.

According to one embodiment, the processors of all of the monitoring devices in the system are programmed to start up at 9 am. A user who wants to book a room "A" from 10 am till 11 am on a given day opens up a booking application on the centralised server and enters a start time of 10 am and a finish time of 11 am on the given day on a centralised booking calendar. Another user opens up the booking calendar and books room A for 30 minutes, starting at 11:30 am. At 9 am all of the monitoring devices, including the one corresponding to room A, go to armed mode. After the wait time has passed, all devices wake up their radios and report to the central system that their rooms have been empty for the past wait time. At the same time the monitoring device of at least room A receives a start time of 10 am, as noted in the booking calendar. At 10 am the monitoring device of room A goes to armed mode and detects movement. It re-initialises its counter every time movement is detected. When no more movement is detected at 11:05 am, the monitoring device waits a further wait time, switches on its radio and reports that the room is now free. It may also report that the room was occupied from 10 am till 11:05 am. In any case, since the central server knows the wait time value, it can work out the time that the room was occupied. The server is thus in a position to be able to update the booking calendar to reflect the real occupation time. The monitoring device then receives a new booking time of 11:30 am, if it did not receive and store it during the previous communication, then switches the radio off. At 11:30 am the device switches to armed mode and begins the process again. In this example the wait time is already programmed into the device. In other cases the device may receive the wait time from the server along with the meeting start time.

As can be seen above, the start time is the time at which the monitoring device starts looking to report on the occupation status of the monitored space. This may be referred to as a pre-determined start time and it is the time at which the counter is allowed to begin counting until it times out. The counter is thus said to count from a pre-determined initial counter value towards a time-out value. The time-out value may be 0, usually for a counter which counts down, or any pre-determined time-out value towards which the counter should count up or down. The initial counter value is based on the wait time. For example, for a down-counter having a time-out value of 0, the counter may be initialised with a value equal to the wait time, sometimes known as the pre-determined wait time. Either of the wait time or the start time may be pre-programmed into the monitoring device or may be communicated to the monitoring device from outside, by the centralised server for example.

Thus far, embodiments have been disclosed in the context of managing conference rooms for example. One aspect is to allow for efficient use of the available conference rooms to be made by using the monitoring devices, controlled using smart timing techniques, to free up a room which was previously reputed to be occupied and then discovered to be unused, the room then being able to be returned to the pool of bookable spaces. Another aspect is to report on the use of the shared spaces, from a historical or statistical point of view, in order to allow for better planning regarding the number of such resources which are required or to better plan working hours of staff so that more efficient use of the resources can be made and so on.

An embodiment of the invention may be deployed for reporting on the use of telephone boxes for example. Such a telephone box may be described as a small room for personal use, such as for telephoning. Advantageously, the motion sensor(s) of the monitoring device(s) of the system described herein, when suitably placed for monitoring motion in such a space, provides a very reliable indicator as to the use of these spaces given the spaces' very small size and well-defined purpose. A person will go into a telephone box to use the phone and then leave. Therefore, the motion sensor can be relied on to provide an accurate indication that someone has just entered the room and that when no further motion is detected the person has left the room. In this embodiment there is no obligation to programme a start time for allowing the counter to count towards time-out. Instead of relying on a start time to define when the monitoring device should go to armed mode, the first detected motion can be taken to define when the monitoring device should go to armed mode. The first detected motion can simply be taken to mean that someone has entered the room. The start time can therefore be said to be optional given that the embodiment used in this particular case does not need a pre-determined start time. If the telephone booth is not used, then the monitoring device will report on the occupation status of the monitored space being empty after the wait time has lapsed. Otherwise, if movement is detected, then the report of the booth becoming empty will come later because each detected movement causes the time-out counter to be re-initialised, thereby delaying the time when the booth can be reported as being unused. Consequently, an embodiment of the monitoring device exists where instead of having a wireless transceiver, the monitoring device simply has a wireless transmitter. Such a monitoring device, deployed for monitoring the occupation status of a particular small space such as a telephone box, does not need to rely on a start time for arming the counter to initialise and begin counting because it may simply rely on a first detected movement to assume that a person has just entered the telephone box. Likewise it does not need to receive any booking or scheduling information since further occupation of the telephone box will be of a spontaneous nature and the next detected movement following a return to the unarmed mode is sufficient to set the device to armed mode again.

A general concept of systems in which any of the embodiments of the invention described herein may be deployed, is that in order to allow for the radio transceiver of the monitoring device to remain in low-power mode by default and only to wake up the radio transceiver (or receiver) when it is time to either provide information pertaining to the actual occupancy status of the space being monitored or, as the case may be, to receive one or more new programmed times for entering armed status, it is always the monitoring device itself which decides when the radio has to be switched on in order to receive and/or transmit messages. Once message transmission/reception has been completed, the monitoring device returns to the default mode whereby the radio is once again returned to its non-transmitting, non-receiving, low-power mode. During low power mode the monitoring device can be armed or unarmed depending on the programmed meeting times. Unarmed mode is the default. Armed mode is entered when a scheduled meeting is reached and it remains valid until no movement has been detected over the duration of the wait time. In other embodiments armed mode is entered when a first movement is detected and it remains valid until no movement has been detected over the duration of the wait time.

Figure 3:
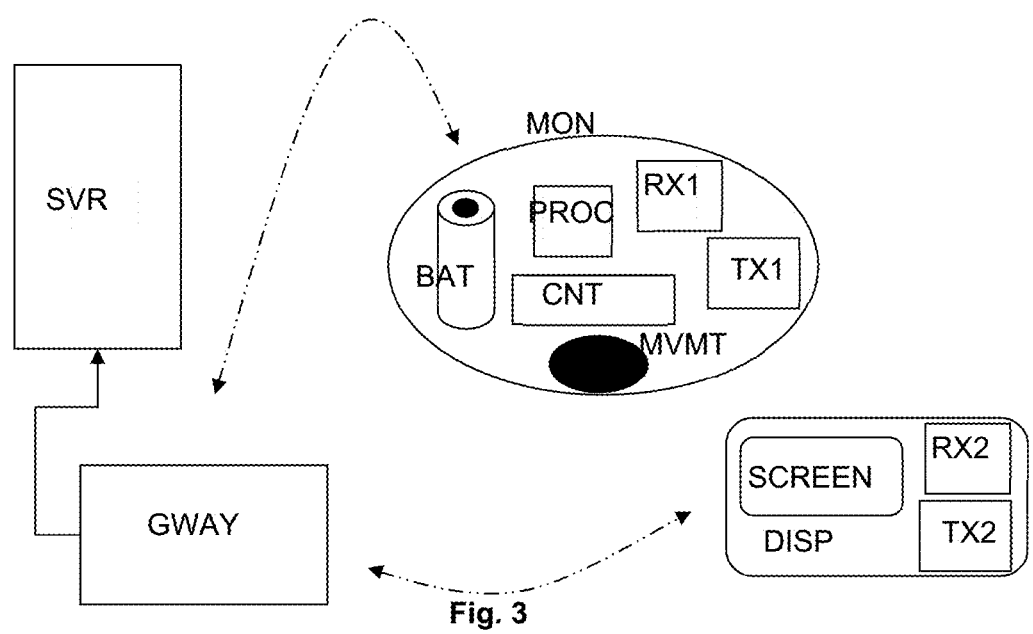
FIG. 3, showing a monitoring system according to an embodiment disclosed herein.

According to an embodiment, a system comprising the monitoring may further comprise a display device for displaying the booking times of the room and/or the actual occupation status of the room, thus providing a configuration including the monitoring device, the server and the display device. The display device could be a tablet computer having a display for example, possibly the display being a touch-sensitive display. In order to keep the power consumption of the configuration suitably low, it is preferable to use a bi-stable display, which only uses current when the display updates and which only updates when there is new information to display. Consequently, such a display would use little or no current when it displays the booking status of its corresponding space and will only use current if it receives an instruction from its corresponding monitoring device, via the server or gateway device, to update the display when the monitoring device detects that a meeting has finished before schedule, thus showing the room as being free. A system such as this is shown in FIG. 3.

The display device is configured to show the actual occupation status of the monitored space as accurately as possible. To this end, the display device comprises its own wireless transceiver, or at least a receiver, since most embodiments do not require the display device to transmit anything. The display device is configured to be able to switch the wireless receiver on when it needs to receive information from the server or the gateway device and to switch the receiver off in order to save power. The timing of the switching on and off of the receiver in the display device is arranged so that the display device is kept up to date with changes in occupancy status of the monitored space in a very efficient manner through communications from the server or gateway device based on occupancy information obtained from the monitoring device via its wireless communication channel with the server or gateway device.

As in the case of the monitoring device, it is the display device which operates the switching on and off of its receiver. The server or gateway device is able to detect when the display device's receiver has been switched on and so can send a message comprising information about the last occupation status received from the monitoring device. Furthermore, at the same time the server may provide a new time for the display device to switch on its receiver. The receiver may be switched off again after the message or messages have been received, in order to save energy.

Appropriate times for switching on the display device's receiver may be for example just after a wait time following the expected start time of a meeting. This allows for the display device to check if anyone actually appeared for a scheduled meeting. In order to ensure that the server will be able to provided updated information concerning the occupation status of the room, the display device should wait not only for the wait time following the scheduled start time but also a lag time, thus allowing time for the communication regarding occupancy of the room to be sent first from the monitoring device to the server and then from the server back to the display device. This lag time may be less than a second and could even be in the order of milliseconds. In practice it is convenient to use a lag time in the order of seconds or minutes. Any lag time may be used as long as it is long enough to ensure that the server will already have the updated occupation status but short enough for the display to be able to report the actual status of the occupation of the room accurately or in a timely fashion for the purpose of potential users.

Another appropriate time for switching on the display device's receiver may be the expected end time of a meeting at the monitored room. For example, by waiting for a wait time after the expected end time plus the lag time mentioned above, the display will be able to accurately show the occupation of the room with respect to whether or not the previous occupants left at or before the expected time. Switching on the receiver near, and preferably just after, the expected end time will allow the display device to report whether the previous occupants left within the wait time from the planned end time.

Other appropriate times for switching on the display device's radio, thus enabling the display device to be updated to show an early vacating of the room being monitored after the meeting actually did start may be successive wait times following the first switch on time to check if the meeting actually started. When the display learns that the room is occupied after the expected start time, it may then continue to switch on the receiver at regular wait times or check times, shorter or longer than wait times, in the hope of accurately reflecting the occupation status of the room when the meeting finishes earlier than expected. The check time should be chosen to be short enough that the display can be updated in a reasonable time to be able to reflect the reality of the occupation status with acceptable accuracy while being long enough not to dissipate unreasonable amounts of energy when switching on the radio.

Similarly to the monitoring device, the first switch on time of the receiver may be pre-programmed in the display device before deployment or may be programmed by a technician having root access or by a user having access in order to set a first switch on time. A convenient first switch on time could be the first switch on time of the monitoring device's receiver plus the monitoring device's wait time plus the lag time mentioned above. Thereafter, the display may receive further switch on times from the server when the receiver is switched on.

Figure 4:
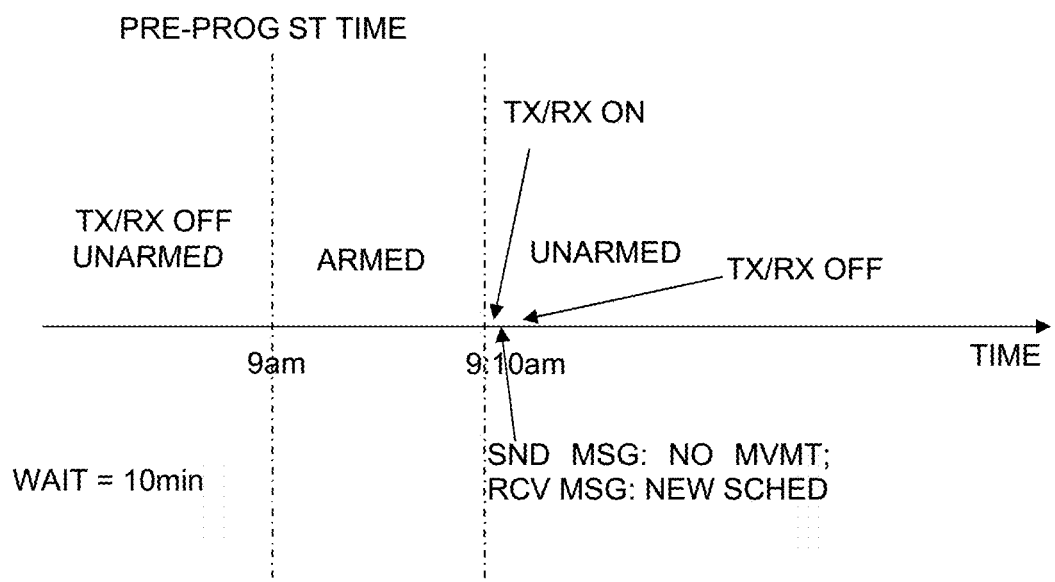
FIG. 4, showing an example sequence of events related to a monitoring device according to an embodiment after initial set-up and before a presence has been detected.

FIG. 4 shows an example of a sequence of events in a system according to an embodiment of the present invention. In this example, the system comprises a monitoring device and a server but no display device(s). The system may further comprise any number of further monitoring devices each configured to detect movement in their respective work spaces. The monitoring device has a pre-programmed start time of 9 am and a pre-programmed wait time of 10 minutes. Before 9 am the monitoring device keeps its transceiver in the default off condition and holds its counter in unarmed mode at least by preventing it from counting. The time-out counter may be initialised using the wait time value of 10 minutes at this time or it may wait until it is time to arm the time-out counter before initialising it. At 9 am the monitoring device arms its time-out counter and allows it to begin counting towards time-out. In this example no movement is detected by the motion sensor and so the time-out counter is allowed to time-out uninterrupted. Consequently, after the wait time the counter times out, the counter returns to the default unarmed mode and the transceiver is switched on at 9:10 am. The monitoring device sends a message to the server, allowing the server to read or otherwise calculate that the room has been un-occupied for the last ten minutes and so has remained empty since the planned start time for the meeting. The server may then update the central calendar to reflect the actual occupation status of the room and may also store the information for future statistical analysis. The server may also send at least one new expected meeting time to the monitoring device according to its centralised calendar and the monitoring device will use this time as a new time for arming the time-out counter.

Figure 5:
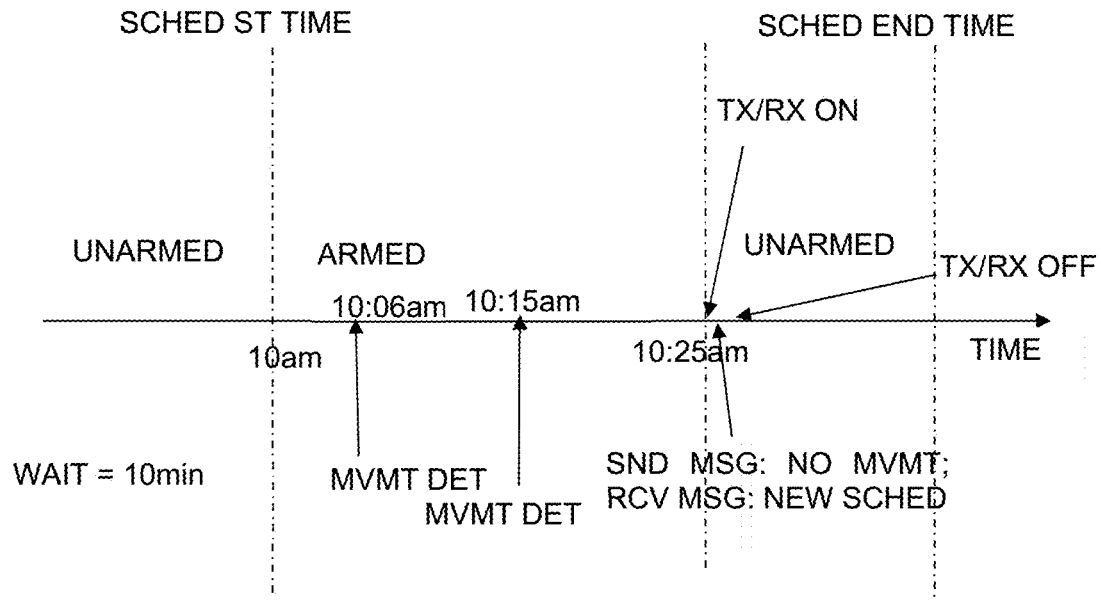
FIG. 5, showing an example of a sequence of events which may occur when a monitoring device according to an embodiment described herein detects a presence.

FIG. 5 shows another timing example which may be said to describe the above system after a new scheduled meeting time has been received. Here the monitoring device previously received a new scheduled meeting time of 10 am. The monitoring device is in unarmed mode until 10 am when it switches to armed mode. Consequently, movements detected at 10:06 am and at 10:15 am, both occurring before the time-out counter has timed out, cause the counter to be re-initialised to 10 minutes. The last movement was detected at 10:15 am and the counter times out at 10:25. The counter goes back to unarmed mode, the transceiver is switched on until the message reporting the non-occupancy of the room has been sent and another new meeting schedule time has been received, then the transceiver is switched off.

Figure 6:
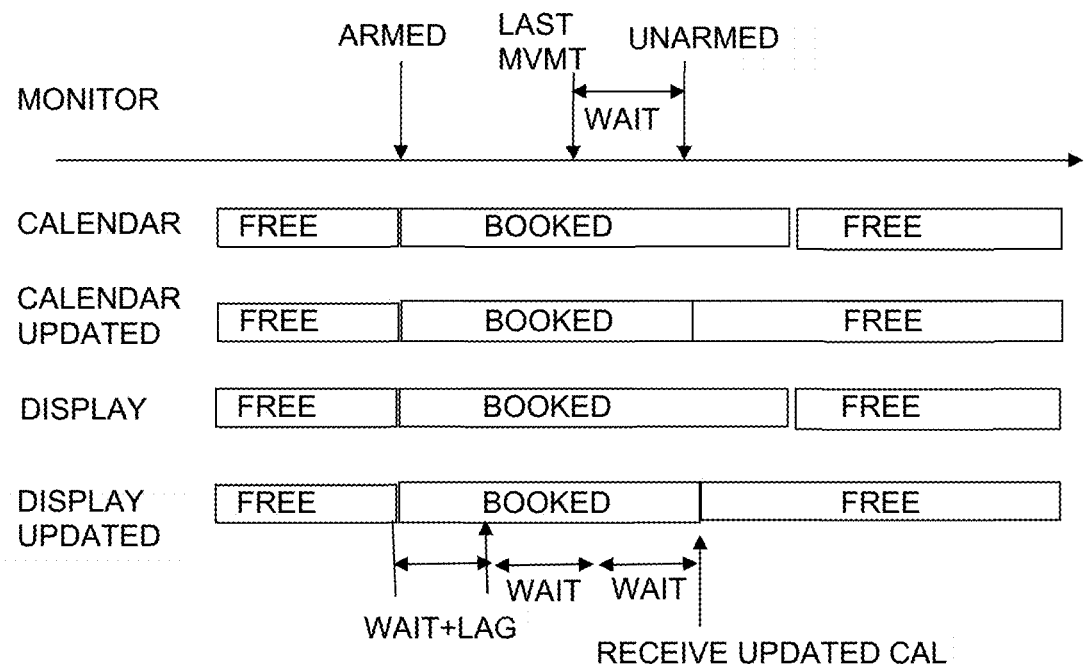
FIG. 6, showing a sequence of events which may take place within a system in which an embodiment of the present invention is deployed.

FIG. 6 shows a sequence of events which may occur in an embodiment which includes a display device. This diagram shows how the system can be used to keep the centralised calendar up to date in an accurate manner and to keep the display of the occupation status of the room up to date within a reasonable time of a room which was expected to be booked becoming free. The centralised calendar is updated in the same manner as described above. The display shows whatever the last booking start and end times it previously received from the server. Then when the expected start time of a new meeting is reached and the monitoring device arms itself, the display device may check to see if the meeting actually started. This would allow it to immediately update the display screen to reflect the no-show. To do this it waits for the wait time, then waits a further lag time as described above, switches on its receiver to find that the room is actually occupied. No change is made to the display screen. In order to show accurately whether the room is vacated before the expected end time the display device may wait then switch on the receiver. It may repeat this until it finds that the room is no longer occupied. If this happens before the expected end time, then the display is able to reflect the early departure as shown. Otherwise it may show an expected departure. In some embodiments there is no polling in this fashion and the display will simply wait until the expected end time to see if the meeting actually ended.

According to a particular embodiment, a system may be used to monitor the occupancy status of a single room. Such a system would have the monitoring device and the server described above. The system may further include the display device described above. In a particular variant, the system may have just the monitoring device and the display device, with the display device storing the centralised booking schedules and so functioning as the centralised server. Bookings may therefore be entered directly on the display device by a user in this case.

The invention claimed is:

1. A monitoring system comprising:
one or more monitoring devices for monitoring an occupation status of a respective space, each monitoring device including
a presence detector configured to monitor an occupation status of said space;
a time-out counter;
a monitoring device wireless transmitter configured to be automatically switched between a default sleep mode and an operating mode; and
a processor for controlling the monitoring device;
each monitoring device having an armed mode, during which the time-out counter, pre-initialised using a locally stored wait time value, is configured to count towards time-out, and an unarmed mode during which the time-out counter is disabled;
wherein the processor is configured to:
switch the monitoring device from unarmed mode to armed mode either at a locally stored start time or at a time when the presence detector detects a presence;
during armed mode, re-initialise the time-out counter using the wait time value when the presence detector detects a presence;
return the monitoring device to the unarmed mode when the time-out counter times out;
switch the monitoring device wireless transmitter from the sleep mode to the operating mode once the time-out counter has timed out, said time-out indicating that the space has been unoccupied for the past wait time; and
return the monitoring device wireless transmitter to the sleep mode at least after having transmitted a message indicating at least that the space is unoccupied;
for each monitoring device, a corresponding display device, the display device including
a display screen;
a display device wireless receiver configured to be automatically switched between a default sleep mode and an operating mode; and
a controller configured to
control the display device at least to display on the display screen an indication of the occupation status of the corresponding monitored space;
intermittently switch the display device wireless receiver to the operating mode and back to sleep mode in order to allow the display device to receive updated occupation status information concerning the monitored space;
switch the display device wireless receiver of the display device to the operating mode a first time according to a pre-determined display start time, the display start time being later than the start time of the monitoring device by at least a pre-determined lag time, the lag time being sufficient to allow the display device to receive a message from a server, the message from the server being based on the message transmitted by the monitoring device, the lag time being in the order of several minutes or less;
switch the display device wireless receiver back to the sleep mode when a message has been received via the display device wireless receiver; and
update the displayed occupation status based on the occupation status indicated in the message received via the display device wireless receiver;
subsequently switch the display device wireless receiver to the operating mode at least once and at least under any of the following conditions:
the received message indicates that the space is unoccupied and includes an expected beginning time for a planned occupation of the space, the controller configured to switch the receiver of the display device to the operating mode at a time which is a sum of:
the expected beginning time;
the wait time value of the monitoring device; and
the predetermined lag time; and/or;
the received message includes an expected end time for a planned occupation of the space, the controller configured to switch the display device wireless receiver to the operating mode at a time which lags the expected end time by the predetermined lag time;
switch the display device wireless receiver back to sleep mode when a new message has been received via the display device wireless receiver and
update the displayed occupation status accordingly.

2. The system according to claim 1, wherein the controller is further configured to switch the display device wireless to the operating mode when the message from the server to the display device indicates an expected end time and includes an indication that the space is occupied, the controller being configured to switch the display device wireless receiver to the operating mode at least before the end time.

3. The system according to claim 1, further comprising a central server storing a database comprising scheduling data relative to planned occupation of one or more of the monitored spaces, the database being updateable and editable by a user, the server configured to receive occupation status messages from the monitoring devices, update the scheduling data accordingly and to return new or updated scheduling information to the corresponding monitoring device.

4. The system according to claim 3, wherein the server is further configured to detect when one or more of the displays devices switches its receiver to operating mode and to send the received occupation status and/or updated scheduling information to the corresponding display device during said operating mode.

5. The system according to claim 1, wherein the display screen is of a type which consumes power when information displayed on the screen is changed and consumes substantially no power when information displayed on the screen remains the same.

6. The system according to claim 1, wherein the display device is battery-operated.

7. The system according to claim 1, wherein the message indicating at least that the space is unoccupied indicates at least the value of the time counter at the start time and the value of the time counter at which the time-out counter timed out.

8. The system according to claim 2, wherein the message indicating at least that the space is unoccupied includes at least the value of the time counter at the start time and the value of the time counter at which the time-out counter timed out.

9. The system according to claim 1, wherein each monitoring device further comprises a monitoring device wireless receiver configured to be automatically switched between a default sleep mode and an operating mode; and
wherein the processor is further configured to:

switch the monitoring device wireless receiver between sleep mode and operating mode substantially in-phase with the monitoring device wireless transmitter being switched between sleep mode and operating mode; and receive at least a re-arm time to replace the locally stored start time and/or a new wait time value to replace the locally stored wait time value via the receiver during the operating mode.

10. The system according to claim 1, wherein the transmission of messages is disabled during sleep mode of the monitoring device wireless transmitter and/or the reception of messages is disabled during sleep mode of the receiver, a power consumption of the monitoring device wireless monitoring device thereby being substantially lower during the sleep modes than during the operating modes.

11. The system according to claim 1, wherein the presence detector is a motion sensor.

12. The system according to claim 1, wherein each monitoring device is battery-operated.

* * * * *